April 2, 1935. H. J. L. FRANK ET AL Re. 19,513

TROLLEY FOR DISTRIBUTING SYSTEMS

Original Filed July 28, 1930 4 Sheets-Sheet 1

INVENTORS.
Harrison J. L. Frank
and William A. Harper
BY Francis D. Hardesty
ATTORNEY.

April 2, 1935. H. J. L. FRANK ET AL Re. 19,513

TROLLEY FOR DISTRIBUTING SYSTEMS

Original Filed July 28, 1930 4 Sheets-Sheet 2

INVENTORS.
Harrison J. L. Frank
and William A. Harper
BY Francis D. Hardesty
ATTORNEY.

TROLLEY FOR DISTRIBUTING SYSTEMS

Original Filed July 28, 1930 4 Sheets-Sheet 3

INVENTORS
Harrison J. L. Frank
and William A. Harper
BY Francis D. Hardesty.
ATTORNEY.

April 2, 1935. H. J. L. FRANK ET AL Re. 19,513
TROLLEY FOR DISTRIBUTING SYSTEMS
Original Filed July 28, 1930 4 Sheets-Sheet 4
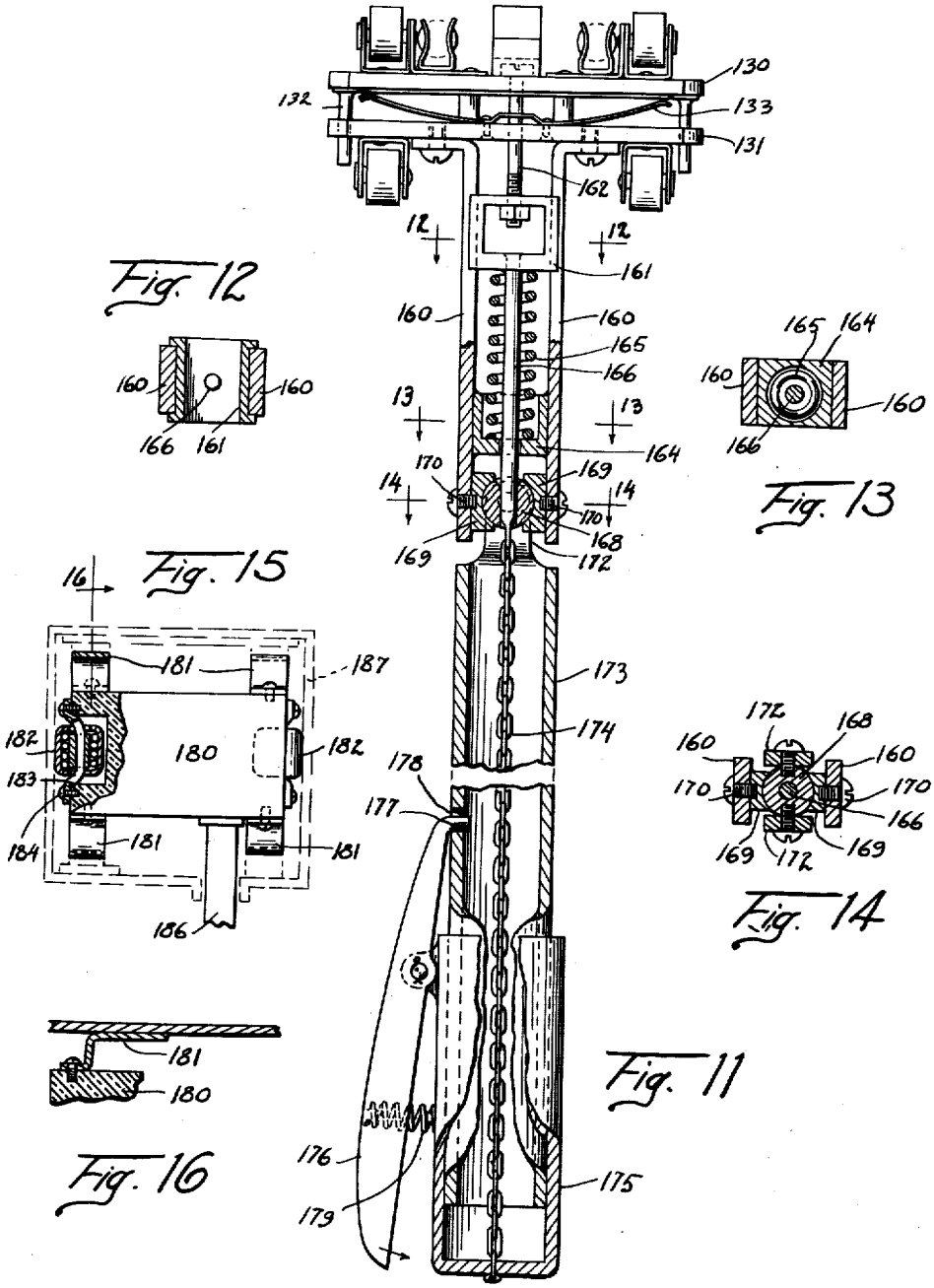
INVENTORS
Harrison J. L. Frank
and William A. Harper
BY Francis D. Hardesty.
ATTORNEY.

Reissued Apr. 2, 1935 Re. 19,513

UNITED STATES PATENT OFFICE 19,513

TROLLEY FOR DISTRIBUTING SYSTEMS

Harrison J. L. Frank and William A. Harper, Detroit, Mich., assignors to Bulldog Electric Products Company, Detroit, Mich., a corporation of West Virginia Original No. 1,819,886, dated August 18, 1931, Serial No. 471,382, July 28, 1930. Application for reissue July 29, 1933, Serial No. 682,875

42 Claims. (Cl. 247—3)

This invention relates to current distributing systems and more particularly to systems useful in distributing current from one portion of a factory building to another and it is to be understood that this case is to be considered along with the copending application, Serial No. 682,874, filed July 29, 1933, in the name of Harrison J. L. Frank et al.

This application relates to the collectors or trolleys which take current from the bus bars while the said application, Serial No. 682,874, relates to the bus bars and ducts from which current is to be taken by the trolleys disclosed in this application.

It has been the practice heretofore in factory installations to install, at conveniently located points, outlets from which current may be taken from plug-in devices attached to the end of cords, etc., leading from electrically driven tools. Such installations are extremely disadvantageous in certain types of work, especially those where it is necessary for a factory worker, having an electrically driven tool in his hand to go from one place to another while the tool is operating.

It has been found desirable to provide a trolley system such that the worker can move his electrically driven tool along with the work all the while withdrawing current without interruption, and without creating danger due to snagging or short circuiting of the cords which conduct the current to the tool.

An object of this invention, therefore, is a means from which current can be taken "on the run".

A further object is a trolley including wheels adapted to ride on rails, wheels adapted to ride along bus bars withdrawing current therefrom, and tool supporting means, the current collecting wheels being connected by suitable electrical connectors to a cord which leads to the electrically driven tool supported by the trolley.

A further object is a current collector trolley which is adapted to ride along and be supported by a bus bar enclosing channel or duct, the current collecting trolley being provided with means to take current from the bus bars.

A further object is a novel form of trolley for use with multiphase currents, one which is so formed as to be incapable of mechanical and electrical connection to the bus bars in any but the proper direction, whereby flow of the current in an improper direction is prevented.

A further object is a novel form of trolley, one which is removable from the rails along which it rides only at the end of a rail section, thus forming a permanent, though movable, connection between current collectors and bus bars.

A further object is a trolley provided with sides which may be moved to or from each other and adapted to embrace between them a rail along which the trolley is movable, the construction thus permitting removal of the trolleys from a rail at any point desired, the trolleys being provided with means to open or close the sides whereby removal of the trolley from the rail is prevented except when it is the will of the operator to remove it.

A still further object is a novel form of trolley of the character described in the preceding paragraph wherein a handle means projecting downwardly from the head portion of the trolley is provided with latch means to control movement of the sides of the trolley.

Another object is a novel form of roller contact, one which includes a copper tube or sleeve integrally fastened to the outer race of a conventional or standard roller or ball bearing.

A still further object is a novel form of trolley having separable head portions which are insertable in a bus bar enclosing duct and which when separated engage the duct and the bus bars, although movable along the latter. The trolley thus described is so formed that when the head portions are caused to approach each other, current collection ceases and withdrawal of the trolley from the duct is permitted, the trolley being provided with means whereby the operator can cause the head portions to approach or retract from each other.

A still further object is a trolley having separable head portions which are so shaped as to enter a duct when in one position and to be incapable of withdrawal therefrom when rotated to another position.

Still further objects are novel forms of current collecting devices for trolleys, including wheels, shoes, etc.

A still further object is a novel form of trolley, one which has a handle portion projecting from a head portion and offset therefrom, so as to prevent insertion of the trolley head in a duct in any but the proper direction, whereby flow of current in an improper direction is prevented.

A still further object is a novel form of trolley, one which includes a handle portion which projects downwardly from the duct enclosing the bus bars, and which is provided with a universal joint therein and means to lock the joint so as to rigidify the handle. It is also contemplated to provide the trolley with a means so connected to the separable head portions as to lock the universal joint only when the head portions are moved towards each other, that is to say, when removal of the trolley from the duct is desired.

A still further object is a novel form of plug-in type collector, particularly adapted for use with a current distributing system including a duct or channel having bus bars or other conductors therein. The collector can well be considered as being of the plug-in type, inasmuch as it may be combined with a duct merely by plugging it thereinto. Further, the collector may be equipped with fuses which are disposed within the confines of the duct, upon collector insertion, the construction being such that the fuses are automatically interlocked with respect to and protected by the other parts of the structure in such a way that access to the fuses is possible only after the collectors have been withdrawn from the duct, which withdrawal automatically disrupts the electrical connection between the collectors and the parts thereof, and the duct itself, and its bus bars.

Still other objects will readily occur to those skilled in the art upon reference to the following description and the accompanying drawings in which Fig. 1 is a side view of one form of trolley as if taken in the direction of the arrow 1 of Fig. 2.

Fig. 11 is a side view of a fourth form of trolley, parts being shown in section.

Fig. 12 is a section on the line 12—12 of Fig. 11.

Fig. 13 is a section on the line 13—13 of Fig. 11.

Fig. 14 is a section on the line 14—14 of Fig. 11.

Fig. 15 is a side view, partly in section, of a fifth form of trolley.

Fig. 16 is a section on the line 16—16 of Fig. 15.

*Balancer or semi-permanent type used with channels*

Figure 1:
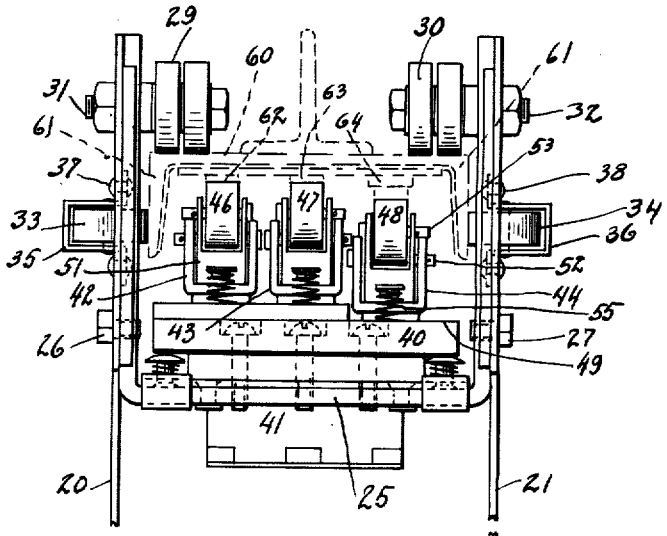
Figure 2:
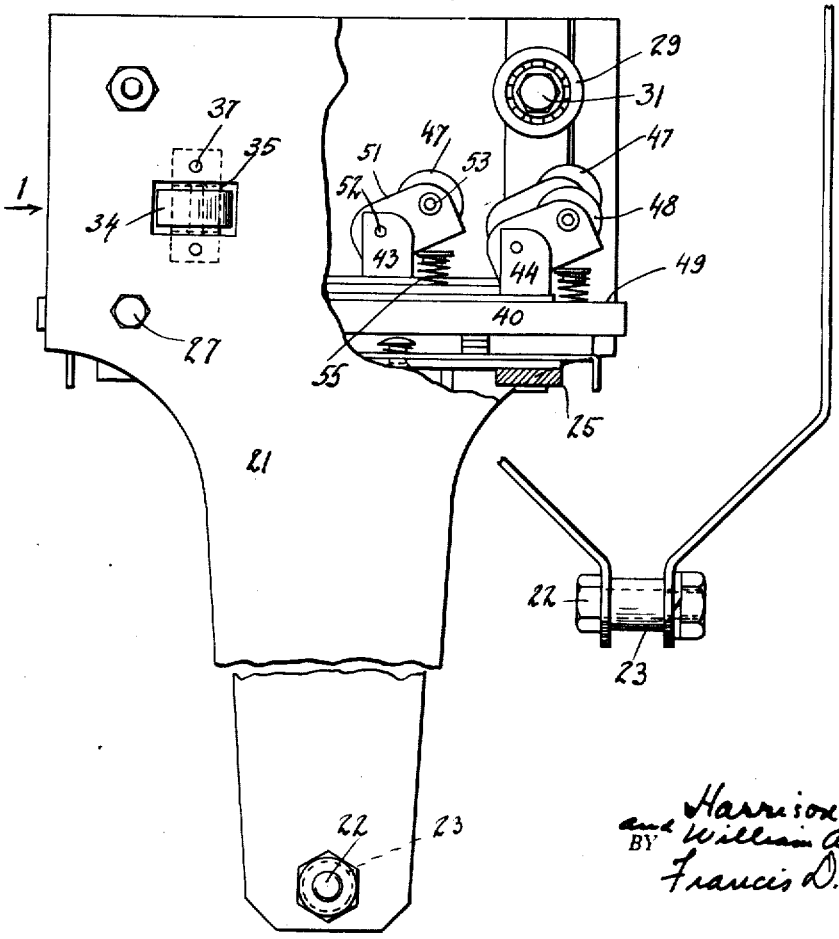
Fig. 2 is a view in elevation of the form of Fig. 1, parts being in section.
Figure 4:
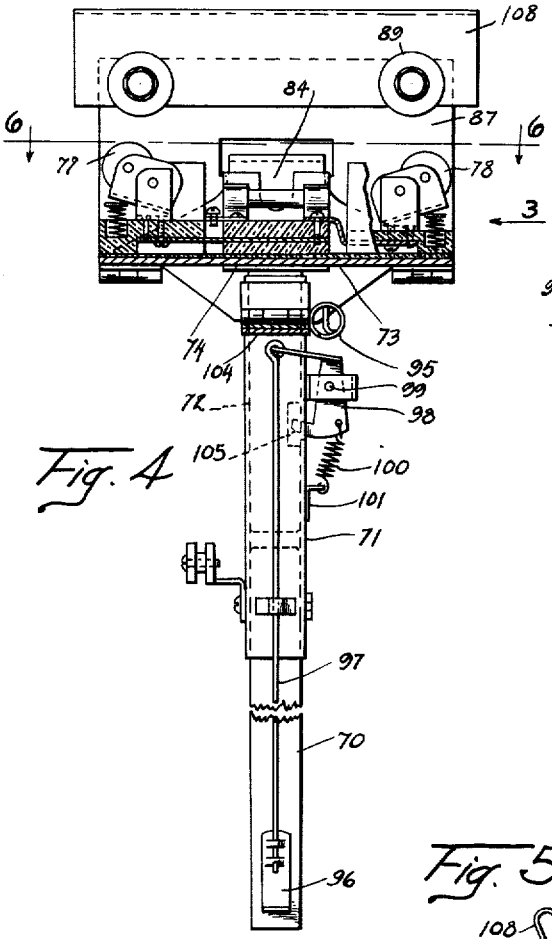
Fig. 4 is an elevation view of the form of Fig. 3, parts being in section on the line 4—4 of Fig. 6.
Figure 3:
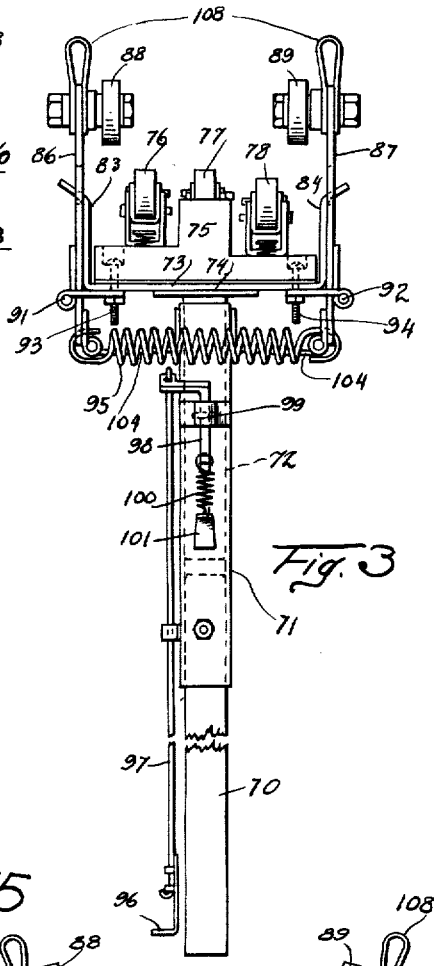
Fig. 3 is a side view of a second form of trolley as if taken on the arrow 3 of Fig. 4.
Figure 6:
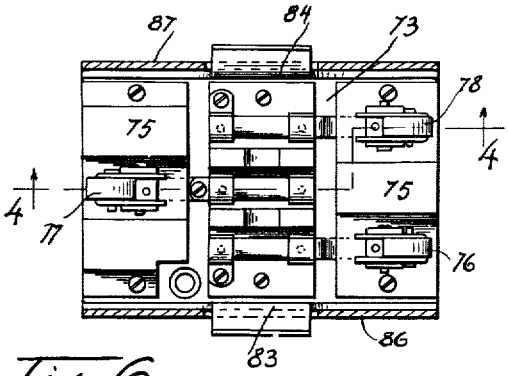
Fig. 6 is a section on the line 6—6 of Fig. 4.

Referring to Figs. 1 and 2, one form of trolley is shown as provided with a pair of side plates 20 and 21 joined to each other at the bottom by means of a bolt 22 disposed within a sleeve or bushing 23, the latter forming a tool or Pedwyn balancer support. A base plate 25, U shaped in cross section joins and is secured to the plates 21 and 20 by means of bolts 26—27, the bolts 22—26—27 forming with the side plates a rigid, non-collapsible trolley construction. At the upper ends of the plates 20—21 there are disposed a plurality of roller or ball bearing trolley wheels 29 and 30, there being four in all, they being secured to the side plates by means of the bolts 31 and 32. Also disposed on the side plates and projecting through slots in the latter are a plurality of rollers 33 and 34, the securing means therefor being the straps 35 and 36 which are riveted to the side plates by means of the rivets 37 and 38. Secured to the base plate U shaped member 25 are a plurality of insulating blocks 40—41 upon one of which are disposed a plurality (in this case six) roller supports 42, 43, and 44, in each of which is disposed a collector wheel, 46, 47, and 48.

As shown in Fig. 1, insulating block 40 is cut away at 49 whereby roller support 44 and roller 48 are disposed slightly below the level of the corresponding parts 42—43—36—47 for reasons to be hereafter described. Secured to the blocks 40—41 etc., is a plug and receptacle device not shown which is adapted to receive fuses and a cord leading to the tool, not shown, and adapted to be electrically connected through plug and receptacle contacts to the collector wheels 46 and 48 in a manner which is also not shown.

A feature of this invention, disclosed in Figs. 1 and 2, is the form of collector wheels found useful in this type of trolley. Each of the supports 42—43—44 is provided with a member 51 which is pivoted to at a point 52 and each of which supports rollers upon an axle 53, there being a spring 55 disposed on the block 40 and adapted to cause upward movement of part 51 thereby causing the roller supported thereby to be thrust upwardly in constant engagement with the bus bar.

In use, the trolley of Fig. 1 is disposed upon a channel 60 which has downwardly extending flanges 61 and three phase bus bars 62—63—64 on its lower surface, the buses being insulated from one another and from the channel in an appropriate manner. The trolley is slipped on the channel or rail 60 at an end thereof, its wheels 29 and 30 riding on the upper surface, its wheels 33—34 engaging the side flanges 61 for absorbing side thrust and its collector wheels 46—47—48 engaging the under surface of the buses 62—63—64 respectively.

It will be observed that due to the displacement of bus 64 and collector wheel 48 it is impossible to insert the trolley in the channel in any position other than the one shown, this construction preventing contact 48 from engaging any but the bus 64, thus polarizing the trolley and preventing flow of current through the tool fed thereby in an improper direction.

*Portable type used with channels*

Figure 5:
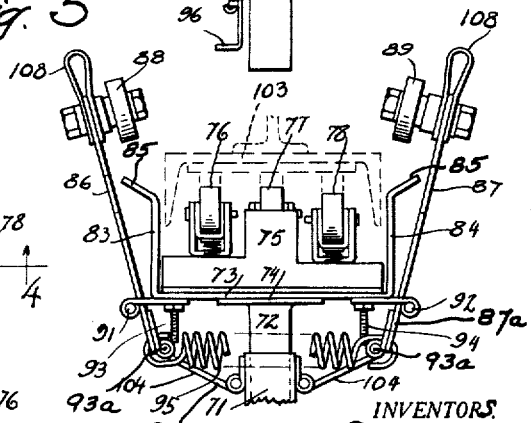
Fig. 5 is a view of a portion of the form of Fig. 3, parts being shown as moved to a trolley release position.

In Figs. 3 to 6 inclusive, there is shown a second form of trolley, one which is adapted for use with the channel type distributor disclosed in Figs. 1 and 5 but which is removable from the channel or rail at any point, the trolley being provided with separable sides whereby such removal is facilitated. In this form of trolley there is provided a handle 70 which extends upwardly into and is secured to a sleeve 71 which slides on the downwardly extending post 72 welded and secured to the base 73 of the trolley as indicated at 74. Secured to the base 73 are insulating blocks 75 upon which are secured the collectors 76—77 and 78, these last mentioned parts being similar to the corresponding parts of the form of Figs. 1 and 2. The base 73 is upwardly extended at 83 and 84 to form guides or thrust plates for the slotted side plates 86—87, upon which are supported the trolley wheels 88—89. The side plates are hingedly secured to the base plate by means of the hinges 91 and 92, secured to the base 73 by means of the bolts 93 and 94, the side plates 86—87 extending somewhat below the base plate 73 to provide portions which are joined and constantly attracted to each other by means of the constantly contracting coil spring 95. Upon the handle 70 there is provided an L-shaped latch member 96 secured to a wire 97 which in turn is secured to a latch 98 pivoted on the sleeve 71 at 99 and held down by a spring 100 secured to the sleeve 71 at the point 101.

When a trolley is to be placed upon a channel 103, its sides are separated or moved to the position shown in Fig. 5. The trolley is then placed under and against the channel and handle 70 is pushed upwardly against the bottom of the channel. Sleeve 71 moves upwardly on post 72 and links 104, connecting it with the side plates 86—87, are thrust outwardly, moving the side plates on their pivots 91—92 towards the channel, causing wheels 88 and 89 to be disposed above the channel 103. The parts are held in this position by means of the coil spring which acts exactly in line with the links 104 and by means of the latch hook 105 which prevents post 72 from moving upwardly in sleeve 71.

When a trolley is to be removed from a channel, its sides are to be separated and this is accomplished as follows: Latch member 96 is depressed, forcing hook 105 out of the sleeve 71 and the post 72, permitting relative separation of these parts. The handle 70 and sleeve 71 are pulled downwardly, wheels 88 and 89 resting on the channel 103, and the straight line linkage 104—104 is broken, thus permitting spring 95 to pull the lower portions of side plates 86—87 towards each other and causing their upper portions to separate, thus releasing the trolley from the channel.

It will be observed that the upper edges of side plates 86—87 are protected by fiber sleeves 108 which prevent the metal plates from bridging or engaging the buses in the event a trolley is inserted in a channel with its sides closed, or with one side inside the channel.

It will also be observed from Fig. 5 that the extensions 83—84 of the base 73, by virtue of their diverging lips 85, facilitate the proper mounting of a trolley on a channel, they abutting the lower edges of the channel sides and thus guiding the trolley into its proper position with respect to the channel.

Further, from Fig. 5, it will be seen that bolts 93—94 act as stops against which the hinges 93*a*—94*a* which connect the side plate extensions 86*a*—87*a* to the links 104 are adapted to abut, this construction preventing outward overtravel of the side plates 86—87 due to the tension of the spring 95.

Further, by virtue of its location, the coil spring constantly exerts a pull on the side plates, tending to hold them in desired position, open or closed.

It will also be observed that the blocks 75 form supports for three centrally disposed pairs of fuse clips, (Fig. 4) connected in pairs to the three collector wheels 76, 77, and 78, and automatically thus connected in phase with these collector wheels and consequently with the bus bars of the channel. The pairs of fuse clips are adapted to be connected by cartridge fuses (Fig. 6) in normal use. A construction of this character is of extreme value inasmuch as the fuses are automatically connected to the conductors or bus bars in the channel, and are confined within and protected by the walls thereof, in conjunction with the walls 93, 83, 84, 86 and 87, of the collector, in a closely confined and fully protected space.

Further, the fuses are automatically interlocked with respect to other parts of the structure in such a manner that access to the fuses is rendered impossible while they are alive, it being clearly apparent that the fuses are inaccessible when the collectors are plugged into the channel, and are accessible only after the collectors are removed from the channel, which action of removal automatically disconnects the collector and its fuses from the bus bars.

Further, the plug-in nature of the collector is of value since by a mere plugging-in action, a fused circuit lead-off is provided.

*Portable type—Used with duct*

A third form of trolley, especially useful with lighter electrical loads, is disclosed best in Figs. 7 to 10 inclusive. In this form the trolley head is composed of two insulating blocks 130 and 131, block 130 being provided with pins 132 which slide through apertures in the block 131 whereby to guide blocks 130 and 131 with respect to each other. A bow spring 133 secured to block 131 constantly tends to move block 130 away from block 131 thus forcing the contacts 134 into engagement with the correspondingly located buses 135 in the duct 136, the contacts 134 preferably being of the collector wheel type previously described. Disposed on the insulating blocks 130—131 are fuse clips 138 adapted to support fuses 139 in an obvious manner, there being three such fuses for each of the three phases represented by each of three buses 135; one of the buses 135 being grounded, for obvious reasons. Secured to the under side of block 131 is a handle 140 upon which is pivotally mounted the link or strap 141 which is connected to the block 130 and which passes through an aperture in the block 131. The lower end of link or strap 141 is secured to the pivoted crank 142 provided with a handle 143 whereby when the latter is pressed towards the handle 140, link 141 will pull downwardly, thus causing block 130 to approach block 131 to release the contacts 134 from the bus bars. The trolley is provided with rollers 145 which prevent grabbing due to friction between the collector and the edges of the duct 136.

Figure 8:
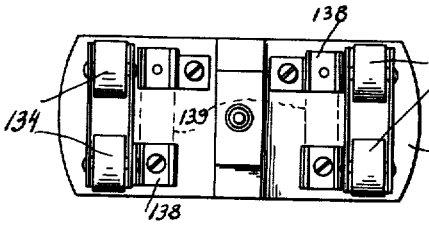
Fig. 8 is a top plan view of a head portion of the form of Fig. 7.

In Fig. 8 it will be seen that the collector head is elongated in cross section so that it can be inserted in the slot 147 of the duct 136 with its long axis parallel to the long axis of the duct, after which it is rotated 90 degrees so that its long axis will not be transverse of the duct, all of this taking place while handle 143 is held adjacent handle 140 and while head portions 130 and 131 are adjacent each other.

After the trolley has been rotated, handle 143 is released and blocks 130 and 131 move away from each other so that the contacts will engage the bus bars for current collection.

In this form, the trolley is supported on the buses themselves, unlike forms previously described wherein the trolleys is supported on a structural steel rail or channel.

Figure 9:
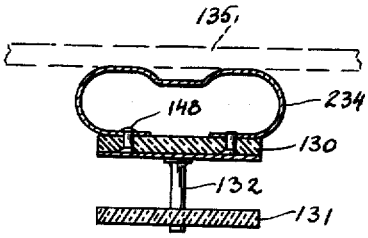
Fig. 9 shows a form of collector contact and is a section on the line 9—9 of Fig. 10.
Figure 10:
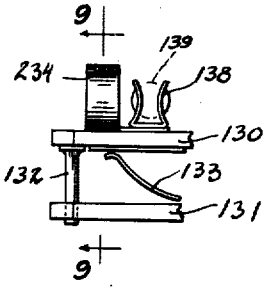
Fig. 10 is another view of the contact of Fig. 9.

Further, contacts 134, which are described, are wheel type contacts, may be replaced by the shoe type contacts 234 disclosed in Figs. 9 and 10, they being secured to the insulating blocks 130 by means of rivets 148.

Further, in order to prevent the current conducting cords which lead from the trolley from becoming entangled and perhaps broken, causing shortcircuiting, etc., fibre tubes 149 are provided, these tubes enclosing the wires which are threaded therethrough and through the aperture 150 (Fig. 7) on the trolley handle.

An inspection of this type of trolley reveals that the fuses 139 thereof, carried by the fuse clips or contacts 139 thereof, are enclosed within the confines of the duct and are automatically connected and interlocked with respect to the other parts of the structure, in a manner that will be apparent from an understanding of the description offered in connection with the trolley collector of Figs. 3 to 6 inclusive.

*Universal type—Used with ducts*

Figure 7:
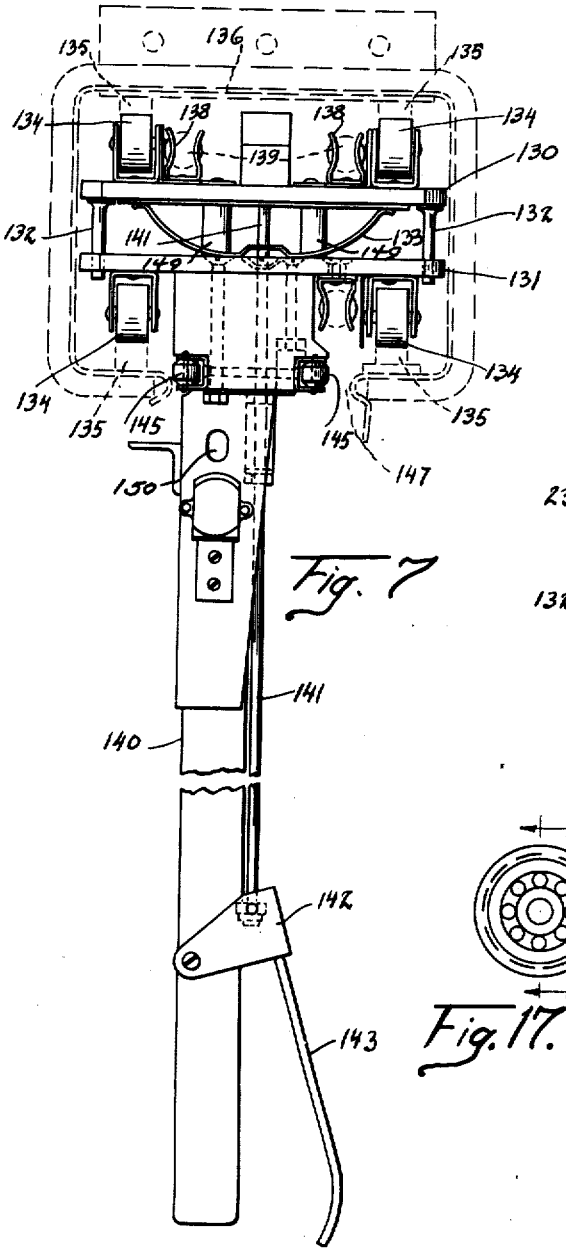
Fig. 7 is a side view of a third form of trolley.

A fourth type of trolley which is also used with ducts for light load, is disclosed in Figs. 11 to 14 inclusive. In this form, the separable blocks 130 and 131 of the forms of Figs 7 and 8 are provided, and block 131 has secured thereto a pair of straps 160 between which is slidable the yoke 161 to which the head 130 is secured by means of the bolt 162. Welded to the sleeve 160 is a support 164 in which is disposed a coil spring 165 which tends to press upwardly on yoke 161 and maintain head portions 130 and 131 separated. A pin 166 secured to the lower side of yoke 161 passes through support 164 and is disposed within the ring 168 of the universal joint, the ring being supported on and between straps 160 by trunnions 169 and bolts 170 and on and between the ears 172 of the tube 173 which forms an extension of the straps 160. On the lower end of the pin 166 is secured a chain or tension member 174, the latter being secured at its lower end to a sleeve or handle member 175 provided with a pivoted latch 176 having a hook 177 disposed within an aperture 178 of the sleeve 173 and held therein by means of the expanding spring 179.

When it is desired to place the trolley in a duct, the rigid trolley, whose parts are in the position shown in Fig. 11, is placed in the duct and rotated. Latch 176 is then pressed by the operator's hand, so that hook 177 is withdrawn from aperture 178, whereupon spring 165 causes separation of blocks 130, 131, and releases the universal ring 168.

When removal of the trolley is desired, handle 175 is pulled downwardly against spring 165 until the latch hook slides far enough down the sleeve 173 to engage within aperture 178.

An inspection of the trolley of Figs. 11 to 14 reveals that it carries fuse clips (Fig. 11) for cartridge fuses and further reveals that with this type of trolley also, the advantages which may be gained by disposing fuses within the confines of the duct, in association with a plug-in collector, readily accrue, just as can be understood with reference to the description of the corresponding features of the trolleys of Figs. 3 to 6 and 7 to 10 inclusive.

*Semi-permanent type—Used with ducts*

A fifth form of trolley, useful with the ducts disclosed in Fig. 7, is disclosed in Figs. 15 and 16. In this form the collector head 180 is provided with contacts 181 similar to those disclosed in Figs. 9 and 10 and with side thrust roller bearings 182 supported on axle forming straps 183 secured to the head by means of the bolts 184. In this form also the axis of the handle 186 is displaced with respect to the axis of the head 180 and of the duct 187, whereby improper rotation of the head in the duct is prevented, this form being insertable in the duct only from an end thereof.

*Modifications*

While there have been shown five different modifications of the trolley, it is obvious that other modifications can be made without departing from the spirit of the invention, whose scope is to be determined by the appended claims and not to be limited by the foregoing description.

For example, in the form of Fig. 1, the side plates may be joined to each other by means of a handle or extension rather than by means of a tool support. Further, the trolley wheels may be disposed at different points, in the event different shapes of rails are used. Also instead of having two collector wheels for each phase as in Fig. 1, it is obvious that one or more than two may be used, if desired.

Similarly, in the form of Figs. 3 to 6, inclusive, the fuse clips may be disposed on the side rather than in the head and more than one collector wheel for each phase member used. Further, other means for releasing the trolley from the rail may be used, if desired.

In the form of Figs. 7 to 10 inclusive, non-separating heads may be used, if desired, the device thus being made a more or less semi-permanent trolley. Further, the fuse clips may be provided on the handle 140 rather than in the head 130—131. Furthermore, the guides 132 may be replaced by other guiding means or may be omitted altogether, if desired.

Similarly in Figs. 11 to 14, a different universal joint and different forms of locking means may be used, if desired.

In the form of Figs. 15 and 16 the handle 186 may be joined to the head 180 on the side thereof rather than at the bottom. Similarly, numerous other modifications may be designed and it is the intention of the applicant to consider all modifications as the full equivalent of those described and claimed.

Figure 17:
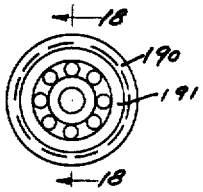
Fig. 17 shows details of the roller contact.
Figure 18:
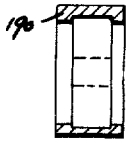
Fig. 18 is a section of Fig. 17 on line 18—18.

Further, if desired, a roller contact of the form of Figs. 17 and 18 may be used. In this form a copper tube or sleeve 190 is fastened to the outer race 19 of a standard form of ball bearing, the latter being usually made of steel. The fastening may be performed in various ways, but it is preferred to swedge or sweat the tube onto the race. This form of roller provides a copper to copper contact between the roller and the copper bus bar and is therefore, superior to ordinary steel roller contacts not so equipped.

It is of course understood that while fuses have been shown as the circuit protective means, it will be understood that other circuit protective means might well be employed, as, for example, circuit breakers or the like.

Now having described the invention and the preferred embodiment thereof, it is to be understood that the said invention is to be limited, not to the specific details herein set forth but only by the scope of the claims which follow:

1. In a current collector, parallel, plate-like contact supports movable bodily towards and away from each other in a direction transverse to their planes, a bow spring between said supports constantly tending to separate them from each other, and a manually operable means to cause said supports to approach each other.

2. A current collector including contact supports movable to and from each other and a handle, said handle being provided with a hinge joint and with means to move said contact supports towards each other.

3. A current collector including contact supports movable to and from each other and a handle, said handle being provided with a hinge joint, with means to move said contact supports towards each other, and with means to lock said joint to rigidify said handle.

4. A current collector including contact supports movable to and from each other and a handle, said handle being provided with a hinge joint, with means to move said contact supports towards each other, and with means to lock said joint to rigidify said handle, said locking means being so connected to said support moving means that actuation of the latter locks said joint.

5. A current collecting trolley including a pair of side plates, a contact support secured to and between said plates, contacts on said support, and trolley supports on said side plates, certain of said contacts being displaced with respect to the remaining contacts, whereby improper application of said collector to a current distributor is prevented.

6. A current collecting trolley including a pair of side plates, a contact support secured to and between said plates, contacts on said support, and trolley supports on said side plates, said side plates being separable from each other whereby said trolley may be removed from the current distributor to which it is applied, there being spring means tending to separate said side plates from each other, the collector being provided with means to permit separation of said plate, said means including toggle joints adapted to be broken for plate separation.

7. For use with a current distributor which includes a top horizontal wall and a bottom horizontal wall provided with an elongated continuous riding slot, a current collector head including a pair of parallel plate-like horizontal roller supports mounted so as to move bodily towards and away from each other in a direction transverse to their planes and adapted, when separated, to cause the rollers supported thereby to engage said bus bars, and adapted, when adjacent each other to permit free movement of the collector along said distributor, means between the supports tending to effect separation of said supports, and means depending from the head and riding through and in said slot and operable by pull thereon to free rollers from said duct walls by causing said supports to approach each other.

8. A current collector including a pair of metallic side plates between which a current distributor is to be disposed, and insulators on the edges of said side plates adapted to prevent engagement of said side plates with said distributor.

9. A current collecting trolley including a pair of side plates, a contact support secured to and between said plates, contacts on said support, and trolley supports on said side plates, said side plates having insulator coverings on their upper edges.

10. In combination with an elongated bus duct including elongated bus bars and an enclosing casing provided with an elongated opening in a wall, a current collector device in the nature of a relatively short trolley device disposed within the confines of the duct and having means co-operatively engaging duct portions to hold the device in and to close a portion of the duct, the device including a body of insulating material, current collectors thereon engaging the bus bars, circuit protective means, and current lead-off conductors, the collectors and the circuit protective means being disposed within the confines of the duct.

11. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, and trolley supports on and between said side plates.

12. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, and trolley supports on said side plates, said side plates being readily movable with respect to each other whereby said collector may be removed from the bus duct between them to which it is applied.

13. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, and trolley supports on and between said side plates, the collector being provided with fuse clips on said contact support whereby fuses may be mounted on said support so as to be contained within the enclosure formed by the duct, the side plates, and the support.

14. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, the trolley supports on said side plates, said side plates being readily movable with respect to each other whereby said collector may be removed from the bus duct between them to which it is applied, said contact support being provided with means to guide and limit movement of said side plates.

15. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, and trolley supports on said side plates, said side plates being readily movable with respect to each other whereby said collector may be removed from the bus duct between them to which it is applied, there being spring means tending to move said side plates into duct releasing position, the collector being provided with means to prevent and means to permit such movement of said plates.

16. For use with a bus-duct having an elongated open bottom, a movable current collector including a pair of side plates having a considerable length along the run of the collector, a plate like contact support secured to and between said side plates and closing the adjacent part of said open bottom, contacts between the side plates on said support and having no portions extending beyond the side plates and adapted to slide along and against bus bars, and trolley supports on said side plates, said side plates being readily movable with respect to each other whereby said collector may be removed from the bus duct between them to which it is applied, there being spring means tending to move said side plates into duct releasing position, the collector being provided with means to prevent and means to permit separation of said plates, said means including a latch device mounted upon a handle portion of said collector.

17. In combination with a bus duct having a top, sides, and bus bars along the inside of the top, a current collector trolley comprising side plates for engaging the duct, a contact support connecting the side plates and having collector contacts thereon for engaging the bus bars, the duct, the sides plates, and the contact support forming an enclosure for the collector contacts, and circuit protective means on the contact support and confined within the enclosure thus formed.

18. In combination with a bus duct having a top, sides, and bus bars along the inside of the top, a current collector comprising side plates for engaging the duct, a contact supoprt connecting the side plates and having collector contacts thereon for engaging the bus bars, the side plates having portions riding on the duct for supporting the collector, the side plates being movable with respect to each other to permit the collector to be withdrawn from or applied to a duct.

19. In combination with a bus duct having a top, sides, and a bottom provided with a slot therein, and bus bars on the inside of facing walls of the duct, a current collector comprising contact supports movable towards and away from each other and the facing walls, contacts thereon for engaging the bus bars, a handle projecting from the duct through the slot, and means associated with the handle and contact supports for separating or drawing together the contact supports, the slot and the handle being assymetrically disposed for polarization.

20. In combination with a bus duct having a top, sides, and a bottom provided with a slot therein, and bus bars on the inside of facing walls of the duct, a current collector comprising contact supports movable towards and away from each other and the facing walls, contacts thereon for engaging the bus bars, a handle projecting from the duct through the slot, and means associated with the handle and contact supports for separating or drawing together the contact supports, and circuit protective means on the supports confined within the duct.

21. In combination with a bus duct run comprising a length of metallic duct of channeled cross section inside of which are lengths of bus bars, a load supporting and collector device comprising a pair of supports, horizontally axled rollers thereon for riding on substantially horizontal rail surfaces of the bus duct run and for supporting the device, vertically axled side thrust rollers thereon for frictionlessly engaging and riding against substantially vertical sides of the bus duct run, a base plate connecting said supports and closing the open channel from below, and current collectors on said base plate and between said supports, for engaging and riding against bus bars of said bus duct run.

22. In combination with a bus duct run comprising a length of metallic duct of channeled cross section inside of which are lengths of bus bars, a load supporting and collector device comprising a pair of supports, horizontally axled rollers thereon for riding on substantially horizontal rail surfaces of the bus duct run and for supporting the device, vertically axled side thrust rollers thereon for frictionlessly engaging and riding against substantially vertical sides of the bus duct run, a base plate connecting said supports and closing the open channel from below, and current collectors on said base plate and between said supports for engaging and riding against bus bars of said bus duct run, said base, carrying said collectors, being removable as a unit from said device.

23. In a trolley type collector head that rides within a distributor duct, a current collector comprising a base having an upwardly projecting part, a member pivotally connected at one end to the part and having an axle at its other end, a collector wheel on said axle, and a compression spring between said base and said member urging them away from each other.

24. For use with a bus duct run having a continuous slot in a wall thereof, and having bus bars therein, a current collector device including an insulated base, forming a barrier between a major part of the duct and the slotted wall, current collectors on said base and supporting rollers on said base, the current collectors being within the major part of the duct and separated from the slotted wall by the base.

25. For use with a bus duct run having a continuous slot in a wall thereof, and having bus bars therein, a current collector device including an insulated base, forming a barrier between a major part of the duct and the slotted wall, current collectors on one side of said base and supporting rollers on the other side of said base.

26. A current collecting trolley including supports which, when in one position, prevent separation of the trolley from a distributor, and which, when in a second position, permit such separation, spring means tending to move said supports towards said second position, and a toggle linkage for maintaining the supports in the first position and adapted to be broken to permit said springs to move said supports to the second position.

27. For use with a trolley duct, a current collecting trolley comprising a head portion in close proximity to the trolley duct and a load support remote therefrom and carried thereby, the head portion having two independent sets of horizontally axled rollers for limiting vertical movement of the trolley with respect to the duct, one set being within the duct and acting as current collector means, and a set of vertically axled side thrust rollers for limiting horizontal movement of the trolley with respect to the duct.

28. For use with a trolley duct, a current collecting trolley having two independent, relatively movable, sets of horizontally axled rollers for limiting vertical movement of the trolley with respect to the duct, one set being within the duct and acting as a current collector means, and spring means for controlling the relative position of said sets of rollers.

29. For use with a trolley duct having a slotted wall, a current collecting trolley comprising a head within the duct and a portion extending downwardly therefrom through the slot of the duct, the head comprising substantially parallel supports and isolating live portions of the duct from the slot thereof, each support, on the side thereof most remote from the other support, carrying a set of rollers, one set thereof serving as collector rollers, the two sets of rollers cooperating with each other to limit movement of the head in said duct, and spring means between the supports and tending to separate them and thus urge the rollers into contact with the cooperating surfaces of the duct.

30. For use with a trolley duct having a slotted wall, a current collecting trolley comprising a head within the duct and a portion extending downwardly therefrom through the slot of the duct, the head comprising substantially parallel supports and isolating live portions of the duct from the slot thereof, each support, on the side thereof most remote from the other support, carrying a set of rollers, one set thereof serving as collector rollers, the two sets of rollers cooperating with each other to limit movement of the head in said duct, and spring means between the supports and tending to separate them and thus urge the rollers into contact with the cooperating surfaces of the duct, and means between the supports for guiding them in their movement towards and away from each other.

31. For use with a trolley duct having a slotted wall, a current collecting trolley comprising a head within the duct and a portion extending downwardly therefrom through the slot of the duct, the head comprising substantially parallel supports and isolating a portion of the duct on one side of the head from a portion of the duct on the other side of the head, each support, on the side thereof most remote from the other support, carrying a set of rollers, one set thereof serving as collector rollers, the two sets of rollers cooperating with each other to limit movement of the head in said duct, and spring means between the supports and tending to separate them and thus urge the rollers into contact with the cooperating surfaces of the duct, and a hinge joint in the trolley portion which extends through the duct slot for permitting movement of said head with respect to the part of said portion most remote from the head.

32. In a current collecting trolley, a unitary structure comprising an insulated base having a substantially flat surface, collectors and fuses on said surface and in substantially a common plane, each fuse being axially alined with a collector.

33. In a current collecting trolley, a unitary structure comprising an insulated base having a substantially flat surface, collectors and fuses on said surface and in substantially a common plane, each fuse being axially alined with a collector, the collectors being arranged in a V, and the fuses being arranged in parallel side by side juxtaposition and in a row.

34. In combination with an elongated duct having an elongated narrow slot of uniform clearance and elongated bus bars, a trolley type current collector having a head formed to ride freely in and along the duct and insertable into and withdrawable from the duct through any part of the narrow slot and having a portion extending through and riding in and along the slot providing means whereby the head may be rotated from outside the duct after insertion for straddling the slot and thus registering the head contacts with the bus bars and thus positioning the head for riding in and along the duct, the head including two parallel plates each having contacts supported thereon, the plates being mounted so as to move bodily towards and away from each other in a direction transverse to their planes and adapted when separated to cause the contacts supported thereby to engage said bus bars, means tending to effect separation of said plates, and means on the portion extending through the slot and manipulable outside of the duct for causing the plates to approach each other and facilitate further manipulation of said head for withdrawal from said slot.

35. In combination with an elongated duct having an elongated narrow slot of uniform clearance and elongated bus bars, a trolley type current collector having a head formed to ride freely in and along the duct and insertable into and withdrawable from the duct through any part of the narrow slot and having a portion extending through and riding in and along the slot providing means whereby the head may be rotated from outside the duct after insertion for straddling the slot and thus registering the head contacts with the bus bars and thus positioning the head for riding in and along the duct, the head including two parallel plates each having contacts supported thereon, the plates being mounted so as to move bodily towards and away from each other in a direction transverse to their planes and adapted when separated to cause the contacts supported thereby to engage said bus bars, means tending to effect separation of said plates, and means on the portion extending through the slot and manipulable outside of the duct for causing the plates to approach each other and facilitate further manipulation of said head for withdrawal from said slot, the portion comprising rigid parts connected by a hinge joint whereby that part of the portion most remote from the head, upon which part is the means aforesaid, may move freely with respect to the head as the head rides along the duct.

36. In a multiphase current collector head forming part of a current collector trolley for riding along a distributor duct, a base, and three separate collectors thereon arranged in V formation, with one longitudinally remote from the group formed by the other two, the collector arrangement restraining rocking of the base as it rides along the distributor duct.

37. In a multiphase current collector head forming part of a current collector trolley for riding along a distributor duct, a base, and six separate collectors thereon arranged in tandem V formation, three to each V, with three at each end of the base, the collector arrangement restraining rocking of the base as it rides along the distributor duct.

38. In a multiphase current collector head forming part of a current collector trolley for riding along a distributor duct, a base, and six separate collectors thereon arranged in tandem V formation, three to each V, with three at each end of the base, the collector arrangement restraining rocking of the base as it rides along the distributor duct, the collectors in one V being electrically connected in tandem with the aligned collectors of the other V.

39. In combination with a trolley duct having an open bottom and bus bars on the inside of its upper wall, a trolley collector having a head within the duct provided with collector contacts on its upper surface for engaging the bus bars, the head shielding the contacts from the space below the bus bars and thus preventing sparks from dropping from the bus bars through the open bottom of the duct, rollers restraining up and down and sidewise movement of the trolley as it rolls along the duct, the trolley carrying fuses below the bus bars of the duct in a shielded manner, and having a trolley manipulating portion passing through and riding in the duct slot and formed with a pivotal joint between the duct and its own lower extremity, whereby longitudinally componented pulls on said lower extremity, even if along lines transversely remote from the duct axis, will cause the trolley to roll along the duct.

40. A current collector trolley device adapted to ride along a trolley bus duct or the like having a current collecting head, and means comprising horizontally axled supporting rollers and vertically axled thrust rollers for restraining all movement of the head in all directions transversely of the longitudinal axis of the duct and not interfering with movement of the head along the duct, the head having resiliently mounted current collector contacts.

41. A current collector trolley device adapted to ride along a trolley bus duct or the like having a current collector head, and means comprising horizontally axled supporting rollers and vertically axled thrust rollers for restraining all movement of the head in all directions transversely of the longitudinal axis of the duct and not interfering with movement of the head along the duct, the head having resiliently mounted current collector contacts and means depending from the head and connected thereto by a flexible joint and manipulable at points laterally remote from the duct to cause the head to ride along the duct or the like.

42. For use with a trolley duct having a slotted wall and a wall opposite the slotted wall provided with bus bars, a trolley head comprising plates providing a barrier between the bus bars and the slotted wall, roller means on the plates engaging the bus bars and the slotted wall, a spring between the plates urging them and their roller means apart and towards said opposite walls, the rollers resiliently restraining all movement of the head transversely of the duct towards and away from the aforesaid opposite walls, and means for guiding such movement of the plates and rollers, and roller means for restraining all movement of the head transversely of the duct in a direction parallel to the aforesaid walls.

HARRISON J. L. FRANK.
WILLIAM A. HARPER.

CERTIFICATE OF CORRECTION.

Reissue No. 19,513. April 2, 1935.

HARRISON J. L. FRANK, ET AL.

It is hereby certified that error appears in the printed specification of the above numbered patent requiring correction as follows: Page 6, first column, line 18, claim 16, for "separation" read such movement; and that the said Letters Patent should be read with this correction therein that the same may conform to the record of the case in the Patent Office.

Signed and sealed this 28th day of May, A. D. 1935.

Leslie Frazer (Seal) Acting Commissioner of Patents.